Jan. 19, 1954     C. O. HURD     2,666,737
FRACTIONATING COLUMN WITH REMOVABLE TRAYS

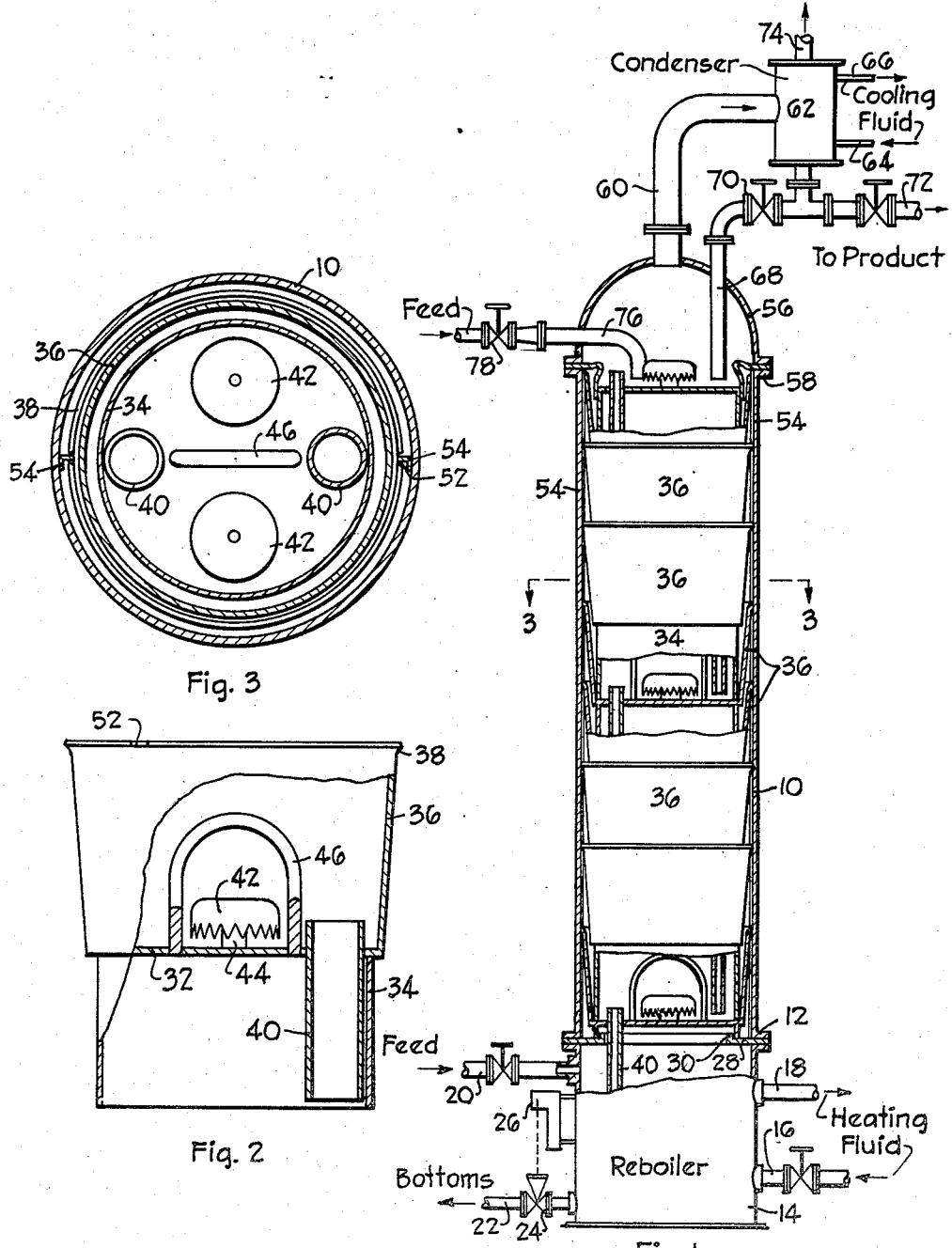
Jan. 19, 1954 — C. O. HURD — 2,666,737
FRACTIONATING COLUMN WITH REMOVABLE TRAYS
Filed Jan. 10, 1949
Inventor
Charles O. Hurd
By Oswald H. Wilmore
his Attorney Inventor:
Charles O. Hurd
By Oswald H. Milmore
his Attorney

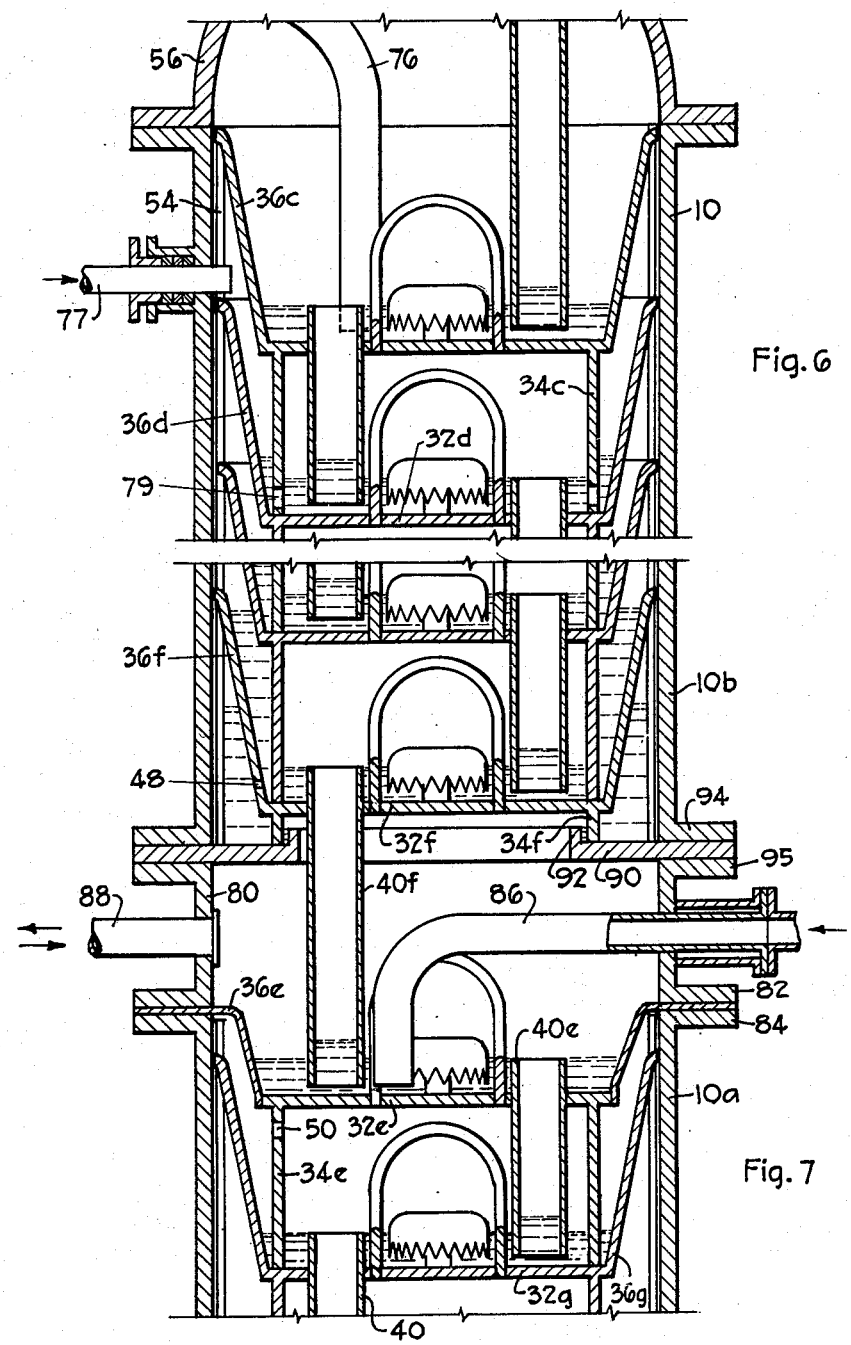

Filed Jan. 10, 1949     5 Sheets-Sheet 4

Inventor:
Charles O. Hurd
By Oswald H. Wilmore
his Attorney.

Inventor:
Charles O. Hurd
By Oswald H. Milmore
his Attorney

Patented Jan. 19, 1954

2,666,737

UNITED STATES PATENT OFFICE 2,666,737

FRACTIONATING COLUMN WITH REMOVABLE TRAYS

Charles O. Hurd, Piedmont, Calif., assignor to Shell Development Company, San Francisco, Calif., a corporation of Delaware Application January 10, 1949, Serial No. 70,024

14 Claims. (Cl. 202—153)

This invention relates to fractionating columns having removable trays. Fractionating columns used for distillation are commonly provided with a plurality of horizontal trays (often referred to as bubble plates) for retaining a vertical series of pools of distilling liquid, downspouts for transferring liquid downwardly from pool to pool and maintaining the desired level within each pool, and vapor-liquid contact means such as bubble caps and the like for bringing vapor from the space above any pool into intimate contact with the liquid in the pool above, whereby the vapors ascend countercurrently to the liquid. Sometimes the spaces above the trays are packed with loose bodies such as beads, cylinders, rings, etc. to effect contact between the vapor and liquid.

Large columns are readily cleaned, repaired, and disassembled by workmen who enter the column through manholes provided in the shell and in the trays. In small vertical columns, where this is not feasible, it is common to avoid the use of horizontal trays and to pack the entire column with a continuous mass of loose bodies which will effect contact between descending liquid and ascending vapor. Columns of intermediate size have heretofore been difficult to operate under certain conditions because they are too small to be serviced in the manner of large columns and are for this reason not well adapted for use with trays and bubble caps, and are too large to permit the use of continuous beds of loose packing material, due to uneven flow of the fluids, sometimes known as "channeling." Further, it is sometimes desirable to equip small columns with trays and bubble caps.

For the foregoing reasons it is often inconvenient or undesirable to seal the trays containing bubble caps or packing material to the column wall by conventional method (such as welding, bolting to flanges or using packing rings or piston rings), especially in the case of small and intermediate diameter column (i. e., under 36 inches in diameter) in which it is anticipated that bubble caps, loose packing, or other parts may require periodic inspection, cleaning, repair or replacement.

It is an object of this invention to provide a fractionating column having removable trays which can readily be removed from the end of the column, without the necessity of having a workman enter the column. While particularly intended for columns of small intermediate sizes, the invention is not limited thereto and can be applied to large columns. Moreover, while the invention is especially useful in enabling the use of bubble caps in such columns, it is also useful when loose packing is used.

A further object is to provide a fractionating column having a shell and a plurality of tray units which may be inserted into the shell and removed therefrom individually (or in groups of two or more), each removable unit being complete with downspouts and vapor-liquid contact means.

A further object is to provide a fractionating column with removable trays having a dependable and easily assembled arrangement for sealing the spaces between adjacent trays from each other to prevent by-passing of stages by either vapors or liquid.

A further object is to provide a fractionating column having removable tray sections which are sealed with respect to each other by liquid seals deriving liquid from the material being distilled, whereby the use of packing material is obviated and the column may be made entirely of metal, ceramic, or other hard and durable material.

Still a further object is to provide a novel arrangement for a fractionating column having removable, liquid-sealed tray sections, wherein the number of stages may be increased by subdividing the column into two or more portions and maintaining in these portions different vapor pressures in the spaces between the shell and the removable sections.

Another object is to provide a removable tray fractionating column wherein the feed material may be introduced at either end or at an intermediate point of the column.

Still other objects of the invention will become apparent from a reading of the following description, taken together with the drawing forming a part of this specification and illustrating several specific embodiments by way of example, wherein:

Fig. 1 is a vertical sectional view of a column constructed according to the invention, certain tray sections and other parts being in elevation;

Fig. 2 is an enlarged elevation view, partly in section, of one of the removable tray sections;

Fig. 3 is an enlarged horizontal sectional view taken on line 3—3 of Fig. 1;

Fig. 6 is a fragmentary sectional view of the top of a column according to a modified embodiment;

Figs. 7 and 8 are fragmentary sectional views of intermediate parts of the column showing two alternate arrangements for introducing and withdrawing fluid from an intermediate point in the column wherein the column is sub-divided into sections;

Figure 5:
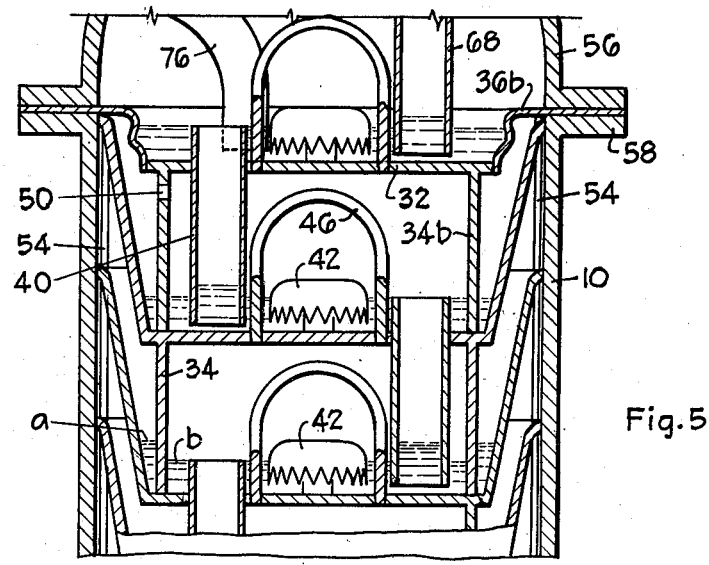
Figs. 4 and 5 are enlarged sectional views of the bottom and top of the column shown in Fig. 1.

Briefly, according to the invention, the fractionating column comprises a plurality of superposed, freely removable tray sections having bubble caps or the like or loose packing material and liquid transfer means, such as downspouts, and sealed with respect to each other by any suitable means against by-passing flow of fluids. "Bypassing flow of fluids" is used in this specification to denote flow of vapor or liquid from a tray or stage to another non-adjacent tray or stage by flow around an intervening tray. In the preferred embodiment these sections are contained within a vertically elongated shell, such as a cylinder of any suitable cross-sectional shape, e. g., polygonal or circular, and the sections are sealed with respect to one another independently of the shell. A preferred sealing arrangement comprises a supporting sleeve fixed to the bottom of each tray deck and adapted to rest on the tray deck of the next lower section and a liquid seal sleeve of somewhat larger diameter, either diverging upwardly, or of cylindrical shape, fixed to the top of the tray deck. The liquid seal sleeve will surround the depending supporting sleeve of the section above, forming an annular trough or basin in which liquid from the section corresponding to the liquid seal sleeve is retained to form a liquid seal. The points or ring of contact of the supporting sleeve with the next lower tray section are thereby submerged in the liquid. Sealing may also be effected without liquid pools for instance by closely fitting engagement of the support sleeves with the adjacent lower trays; such a fit may be improved by providing a packing ring at the ring of contact. It is evident that two or more tray decks, each provided with downspouts and bubble caps may be assembled more or less permanently prior to insertion into the column, and that such assembled trays, in combination, then form the individually removable sections referred to in this specification. Moreover, the expression "bubble caps," as used herein, is intended to denote generically various types of mechanical vapor-liquid contact devices permitting vapor to rise through the tray deck and come into contact with the liquid on the tray for exchange of components between the vapor and liquid.

The interior of the shell, when used, is constructed to permit the free and unimpeded vertical movement of the tray sections therein, e. g., for insertion and removal from the top. While it is preferred to stack the tray sections freely within the shell the invention does not exclude the use of externally operable means for locking the sections to the shell. Such tray sections can be fabricated from any material desired, such as pressed steel, tube sections welded to plate, enamelled iron, ceramic, glass, or synthetic resins.

Referring to the drawings, and particularly to Figs. 1–5, the column comprises a cylindrical shell 10 having a flange ring 12 integral with the shell or welded or otherwise fixed thereto at the bottom. The latter is bolted to a corresponding flange 13 on the top of a reboiler 14 provided with a suitable heating coil (not shown) through which heating fluid may be circulated via conduits 16 and 18. When the charge is to be introduced into the reboiler it may be admitted through an inlet 20. Liquid bottoms or distillation residue may be withdrawn through an outlet 22, controlled by valve 24 which may, if desired, be controlled automatically by a level controller 26. The top of the reboiler has an annular plate 28 with an up-turned flange 30; this flange may, in certain cases, be omitted.

The tray sections may be of identical construction, save that the lowermost and uppermost sections have orifices or ports in certain sleeves and the lowermost section may have a shorter sleeve. As shown in Fig. 2, each section has a tray deck 32; a depending, cylindrical supporting sleeve 34 at the bottom; an upright, upwardly diverging, frusto-conical liquid seal sleeve 36 at the top and having a peripheral lip or flange 38; one or more downspouts 40 welded to the deck and extending through it down to a level just above the bottom of the supporting sleeve 34 and rising above the deck to a height corresponding to the intended liquid level; and a plurality of bubble caps 42, each cap having a vapor tube 44 welded to the deck and in communication through a hole (not shown) in the deck with the space beneath the deck, and rising to a level above the intended liquid level. Sleeves 34 and 36 may be formed separately and welded to the deck 32. The caps 42 are fixed to the vapor tubes and have serrated edges beneath the liquid level. While the liquid seal sleeve 36 is shown to be higher than the support sleeve 34, this is not in every case necessary, as will appear hereafter. For convenience in raising and lowering the sections through the column each section is further provided with a bail or stirrup 46 permanently secured to the top of the deck. The bails preferably extend to above the centers of gravity of the tray section.

Figure 4:
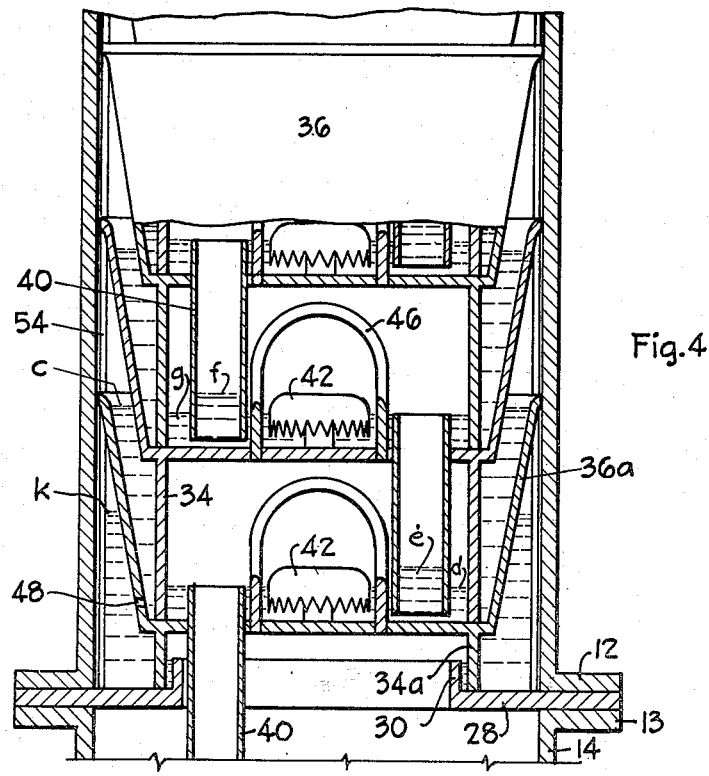

The lowermost tray section, as shown in Fig. 4, has the supporting sleeve 34a of shorter length than the other sleeves, just sufficient to space the deck 32 from the top of the flange 30, and has an orifice 48 formed in the liquid seal sleeve 36a near the bottom thereof. The downspout 40 of the bottom section may be longer and extends downwards to beneath the liquid level in the reboiler 14. The uppermost section, as shown in Fig. 5, has a shorter liquid seal sleeve 36b, which may be made of thin corrugated metal and serves primarily as a vapor seal and also to confine the liquid on the tray deck and does not afford a liquid seal with respect to any higher tray. This sleeve has a wider lip, extending over the top edge of the shell 10. The supporting sleeve 34b of the uppermost section has a pressure equalizing orifice 50 formed near the top thereof. The flanges 38 of all sections except the uppermost section may have positioning notches 52, as shown in Figs. 2 and 3 for engagement with suitable vertical guides, such as vertical angle bars 54 fixed to the inside of the shell.

The top of the column is closed by a removable dome 56, bolted to a flange 58 at the top, and sealing the flange of the sleeve 36b to the shell 10. It is provided with a vapor drawoff duct 60 for conducting overhead vapors to a condenser 62, wherein partial or complete condensation of the overhead may be effected by cooling coils (not shown) through which cooling liquid is circulated via conduits 64 and 66. Liquid reflux is returned to the top of the column through reflux line 68, which extends to beneath the liquid level on the top tray, at a rate controlled by valve 70, and unreturned overhead product is taken off at 72. Uncondensed vapors may be drawn off at 74. If the feed is to be introduced at the top of the column it may be admitted through a pipe 76 and valve 78.

It will be evident from the construction described that the lowermost tray section is sealed to the shell and reboiler and is supported thereby and that all sections higher except the uppermost section are supported by their sleeves 34 by the next lower sections. The invention contemplates the use of any desired arrangement for mounting the lowermost section, e. g., bolting to the flanges 12 and 13 as shown for tray 32h in Fig. 8. According to the embodiment illustrated in Figs. 1–5, it is supported by the annular plate 28 and sleeve 34a. The uppermost section is supported in part by its support sleeve 34b and in part by the seal sleeve 36b which is clamped to the shell. As will be seen presently, it is not essential that the sleeve 34b have a close fit with the deck of the second tray (counting from the top), and it is, therefore, not essential that the sleeve 36b be corrugated.

The tray sections can be emplaced by lowering them successively by means of cables having hooks or other automatic release engagement devices which support the sections by their bails 46. Similarly, after removing the dome 56, the tray sections can be raised successively by these same bails for inspection, cleaning, replacement or repair.

When the column is in operation a pool of liquid will be accumulated on each tray to the levels of the tops of the downspouts 40 (or slightly above these tops when a rapid rate of flow occurs), as indicated in Figs. 4 and 5. Some of this liquid will seep out under the edges of the support sleeves 34, 34a, or 34b to form annular pools in the spaces between the seal sleeves and the support sleeves. The level to which these annular pools will rise is dependent upon the pressures acting on their respective surfaces (i. e., the pressures outside of the support sleeves 34) and the pressures acting on the surface of the liquid pool within the sleeves 34. The former pressure is uniform throughout the height of the column because all of the spaces outside of the sleeves 34 are in communication with one another, it being noted in Fig. 3 that there is a free space between the lip 38 and the wall of the shell 10. This pressure also is equal to the pressure above the liquid on the second tray because the port 50 equalizes these pressures. Hence the level of the annular pool for the second section will be the same as that of the liquid on the second tray within sleeve 34.

The pressure above each tray and within the respective sleeves 34 is progressively greater towards the bottom of the column, due to a pressure drop opposing flow of vapors through the bubble caps. The liquid head corresponding to this pressure drop, herein designated as $h$ (which may be measured in inches of liquid) is indicated in Figs. 4 and 5 by a liquid level within each downspout 40 which is slightly higher than the liquid on the tray. For example, in Fig. 5, the liquid head $h$ is the difference between the levels $a$ and $b$, and in Fig. 4 between the levels $e$ and $d$, or between $f$ and $g$. Because of this progressive increase in pressure each annular pool below the pool of the second section will stand at a level higher than the liquid within sleeve 34 by a distance equal to $$h(n-2)$$

where $n$ is the tray number counting from the top. Thus, as shown in Fig. 5, for the third tray $n=3$ and the level $a$ of the annular pool has a hight of $h$ inches above the level $b$ of the liquid within the sleeve; in Fig. 4, at the bottom section, the level $c$ is farther above the level $d$.

The liquid level in each of the seal sleeves must be below the lip of the respective sleeve 36 or the column will not operate efficiently. The number of trays which can be used in the column will, therefore, depend upon the value of $h$ in relation to the heights of the liquid seal sleeves 36, and it is, in certain cases, desirable to make these sleeves somewhat higher for the lower sections. The number of trays can also be increased by subdividing the shell into several sections, for example as described for Figs. 7 and 8.

The lowermost section is, in the specific embodiment illustrated, sealed against the plate 28 by liquid which seeps through the orifice 48 and fills the space between the shell 10 and the sleeve 36a to a level $k$, which is above the upper edge of the flange 30 by a distance not less than approximately $h(n-1)$, where $n$ is the total number of trays in the column. This prevents vapors from the reboiler from entering the annular space immediately inside of the shell 10 and coming into contact with the material on the higher trays. It thereby prevents the pressure of the vapor in this annular space from rising. The exact level $k$ will depend upon the closeness of the fit of the sleeve 34a against plate 28. If the orifice 48 is made large in relation to the leakage space around the bottom of the sleeve (as would occur when sleeve 34a has a smooth, close fit with plate 28) the level $k$ tends to rise to the level $c$; the column can be successfully operated with such an arrangement. On the other hand, it is also possible to form the bottom of the sleeve 34 with irregularities or serrations to permit a continual seepage of liquid into the reboiler at a rate which is dependent upon the size of the orifice 48 and the pressure difference $c-k$.

It is seen that the column is self-sealing, in that the liquid being distilled forms pools preventing short-circuiting of liquid or vapor between non-adjacent stages. The feature of sealing the sleeve 36b of the uppermost section to the column is particularly effective in preventing splashed liquid from the top section (where splashing is most prevalent) from descending in the annular space immediately inside of the shell 10 and contaminating liquid of different composition in a lower stage. However, this arrangement is not essential to the practice of the invention, and the column may be modified as shown in Fig. 6 by omitting the orifice 50 and the seal between the sleeve 36b and the shell. In this embodiment the uppermost section is supported wholly on the next lower section by its support sleeve 34c and the uppermost liquid seal sleeve 36c is in engagement with the positioning flange 54 but not sealed against the shell 10. The pressure acting on the annular pools within the seal sleeves is that of the top stage; hence these pools will stand above the liquids within the support sleeves 34 by distances equal to $h(n-1)$, and the approximate minimum height of the level $k$ above the flange 30 is $hn$.

A useful characteristic of the column, apart from the ease with which it may be disassembled, is the excellent heat-insulating effect of the annular vapor space immediately inside of the shell 10, which is effective in reducing heat losses.

The embodiments described heretofore are suitable when the feed is to be introduced at the top or bottom end of the column and products are withdrawn at the top and bottom.

Liquid feed, particularly if cool, may be fed into one of the intermediate sleeves 36 for flow into the tray deck associated therewith. Thus, as shown in Fig. 6, a feed pipe 77 may feed liquid into sleeve 36d, from which it passes into deck 32d through one or more large ports 79 in the sleeve 34c below the liquid level. Pipe 77 may be slidably mounted in the shell 10 to permit retraction when the tray sections are to be emplaced or removed.

Figure 8:
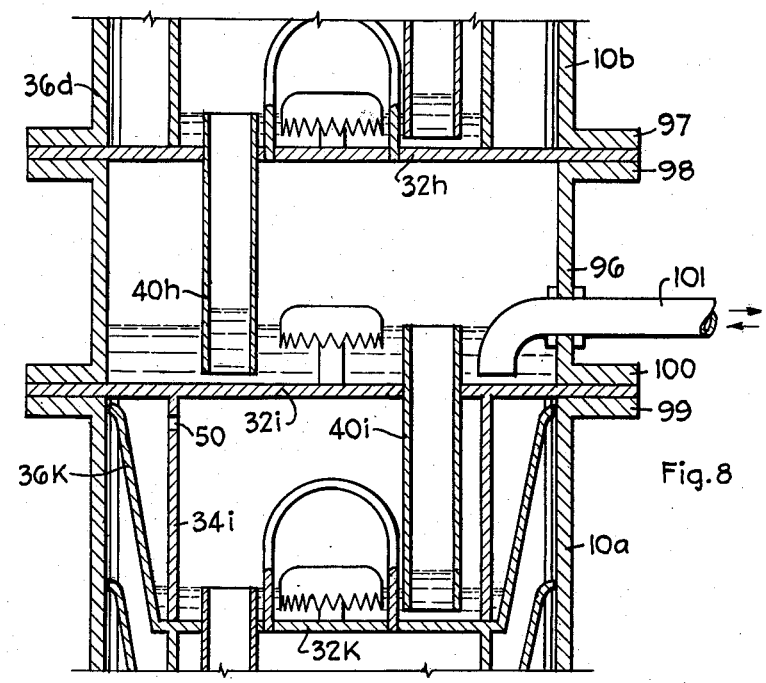

In columns using liquid sealed plates, it is, however, usually preferable to provide special arrangements if the feed is to be introduced at an intermediate point and/or side streams are to be withdrawn at one or more intermediate points. A simple solution of this problem is to break the column into two or more sections at the level where a feed or drawoff pipe is to be fitted. Two alternate arrangements are shown in Figs. 7 and 8.

In Fig. 7 the lower section of the column has a shell 10a and the upper section has a shell 10b. A special intermediate shell section 80 is interposed between these sections. The intermediate shell section 80 is shown to be connected to the lower shell section 10a in much the same manner as the dome 56 was connected to the section 10 in Figs. 1 and 5. In other words, its flange 82 is detachably bolted to a flange ring 84 which is at the top of the shell 10a. The liquid seal ring 36e of the uppermost tray section in the lower shell 10a (designated as having a tray deck 32e) is made of thin material and its annular lip is clamped between the flanges 82 and 84 to provide a seal; the corrugations shown in Fig. 5 are omitted, in this case, but may be used. The supporting sleeve 34e of the uppermost tray section has a vapor port 50 near the top. The section 80 has a feed line 86 fitted thereto, extending to below the liquid level established by the downspout 40e and disposed to feed liquid onto the tray; it may also serve to withdraw liquid as an intermediate product or side stream. Instead of liquid, a vapor feed may be supplied through a vapor pipe 88; it may also be employed to withdraw vapors as a side stream from the column. Either pipe 86 or pipe 88 may be omitted, depending upon the specific use to which the column is to be put.

The top of the section 80 has an annular plate 90 with an inner, upturned flange 92; these correspond to the plate 28 and flange 30 of Figs. 1 and 4 and support the upper shell 10b and the upper tray sections in the same manner as the reboiler plate 28 supports the column 10. In other words, the shell has a flange ring 94 at the bottom, which is bolted to the plate 90 and flange 95, and the lowermost tray section of the upper section of the column (indicated as having a tray deck 32f) has a short supporting sleeve 34f fitting inside of flange 92, while its liquid seal sleeve 36f has an orifice 48 for admitting liquid onto the top of the plate 90 to seal the higher tray sections of the column from vapors within the intermediate shell section 80. The overflow pipe or downspout 40f of this tray section is longer than the others and extends into the liquid on the tray deck 32e. It should be understood that the top of the shell section 10b may be provided with a dome according to any of the embodiments described herein, e. g., as shown in Fig. 5 or 6, and that the bottom of the shell section 10a may be supported on a reboiler as shown in Fig. 4. Moreover, several intermediate sections 80 may be placed at various levels of the column.

The column according to Fig. 7 operates as follows: The tray sections within the upper shell 10b act as a rectifying section, while those within the lower shell 10a act as a stripping section. The pressure above the tray decks increases progressively from the top of shell 10b to the bottom of shell 10a. However, the annular space immediately inside of the upper shell 10b and outside of the support sleeves therein is maintained at a lower pressure than the corresponding annular space within the lower shell 10a. It is not to be implied however that these pressures can differ greatly, the pressure difference being limited by the height to which the liquid can rise within the liquid seal sleeve 36f. Thus, the annular space in each shell is at a uniform pressure equal to that above the second tray section within its respective shell (for the embodiment shown in Figs. 5 and 7 wherein the top sections are sealed to their shells). As a result, the level of the annular pool of liquid outside of the support sleeve 34e is the same as that of the liquid inside of sleeve 36g, and lower annular pools stand at progressively higher levels above the liquid on the tray decks.

In Fig. 8 the column again comprises lower and upper shell sections 10a and 10b; these are separated by an intermediate shell section 96. The upper shell 10b is constructed and operated as described above except that the lowermost tray section thereof comprising deck 32h is of different construction and has a flange extending out beyond shell 96. It is supported and sealed and connected to the top of section 96 by being clamped between flanges 97 and 98 on the shells 10b and 96, respectively. This deck need not have a bail or support sleeve; its downspout 40h extends about to the deck 32i of the lower section 10a. The latter is also of special design in that the tray deck 32i has an annular flange instead of the usual upright seal sleeve, said flange extending laterally over the upper edge of the shell 10a and the flange ring 99. The tray deck is thereby sealed against the shell when the flange 100 of the intermediate section is bolted to the ring 99. The tray deck 32i has the usual downspout 40i and bubble caps 42i, but requires no bail. If the flange of deck 32i is sufficiently rigid the supporting sleeve 34i at the bottom of the deck may not always be in close engagement with the tray deck 32k of the next lower section; while this sleeve may, therefore, in certain cases be omitted, it is preferred to provide it both to insure spacing of downspout 40i from tray deck 32k and to prevent froth which forms on the deck 32k from spilling over the edge of seal sleeve 36k. The flange of deck 32i may optionally be made thin enough to insure contact of the supporting sleeve 34i with deck 32k notwithstanding irregularities in the heights of the tray sections due to inexact manufacture or expansion due to temperature changes. Sleeve 34i has a port 50 near the top.

The intermediate section 96 has a pipe 101 fitted into its side for drawing off liquid from the deck 32i. When so used it is desirable to maintain a pool of liquid on this deck to a greater depth than on the other trays, and the downspout 40i preferably rises to a correspondingly greater distance above the deck, as shown. The pipe 101 may also be used as a feed pipe; in this case the higher level may not be needed and the downspout may rise to the same height above the tray as for the other trays, e. g., as shown for downspout 40e in Fig. 7. The lower tray sections are arranged within the shell 10a as described for shell 10 in Figs. 1–5.

The operation of the liquid seal elements in Fig. 8 is as was described for Fig. 7. It is evident that in Figs. 7 and 8 the intermediate section 80 or 96 may in certain cases be cast integrally with either the upper or lower shell, and of a different e. g., larger diameter.

Figure 9:
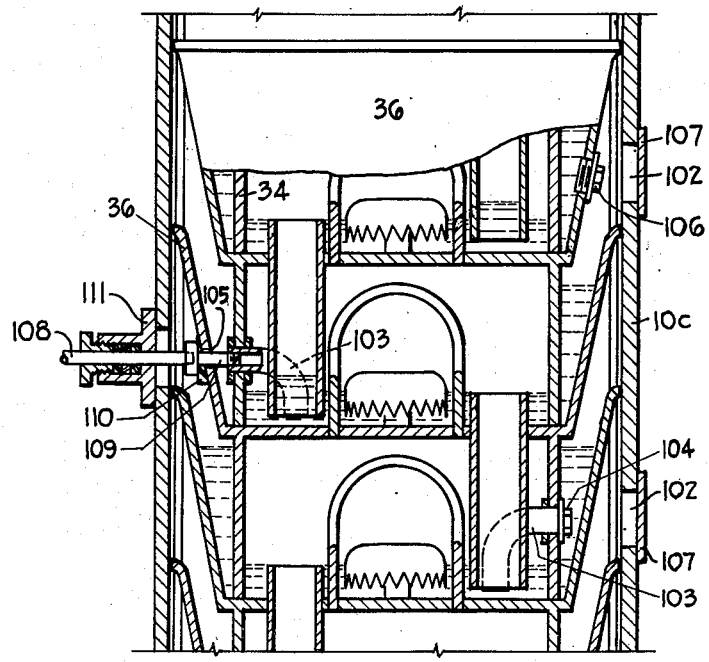
Fig. 9 is a fragmentary sectional view of an intermediate portion of a column containing modified tray sections and illustrating a further modified arrangement for introducing or withdrawing material from an intermediate point.

According to another arrangement for feeding distilland into an intermediate point of the column, as shown in Fig. 9, the tray sections are provided with lateral connections which are in alignment with ports in the shell wall, through which feed or discharge lines may be passed. The unused connections are plugged or capped. Referring to the drawing, there is shown a shell 10c having handholes 102 at various levels. All or some of the tray sections are provided with feed spouts 103. Each spout has its discharge end near the next lower tray deck and passes through the supporting sleeve 34. When not used they are closed by plugs 104. The liquid seal sleeves 36 of these sections have holes 105 aligned with the outer, upper ends of pipes 103, and normally closed by plugs 106. The shell 10c has covers 107 closing the handholes at points where no connection is made with the spouts 103. One or more selected covers 107 may be removed for inserting one or more supply (or discharge) pipes which have couplers at their inner ends. Thus, a supply pipe 108 can be coupled to one of the spouts 103 by means of coupler section 109 after first removing the plugs 104 and 106, the packing ring 110 serving to seal the coupler tube 109 against the sleeve 36. The pipe 108 is sealed to the shell by mounting a cover plate 111, carrying a sealing gland, over the hole in place of the cover 107. The supply pipe being thus sealed to the shell and the spout 103 and coupler 109 being sealed to the sleeves of adjacent tray sections, the functioning of the liquid seal arrangement previously described is not interfered with.

Figure 10:
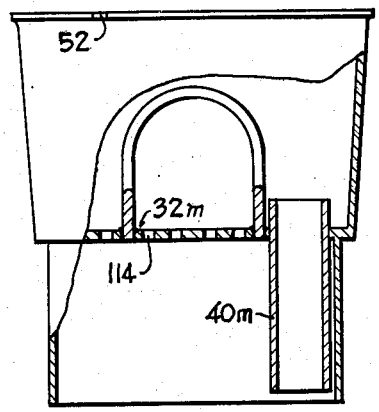
Fig. 10 is a sectional view of a further modified form of tray sections without bubble caps.

As previously indicated, the invention can also be applied to columns without bubble caps. Thus, Fig. 10 shows an alternate type of tray section having a perforated tray deck 32m. Vapors ascending from a lower tray section pass through small perforations 114 and prevent descent of liquid therethrough, and cause a pool of liquid to collect to the level of the top of downspout 40m. The vapors are brought into contact with liquid on the tray by bubbling therethrough. These tray sections are assembled within the shell in the manner previously described for the sections provided with bubble caps. If desired, loose packing material may be placed on the tray 32m, the downspout 40m being then unnecessary because liquid descends through the holes 114, which may be made large enough to permit flow of both liquid and vapor.

Figure 11:
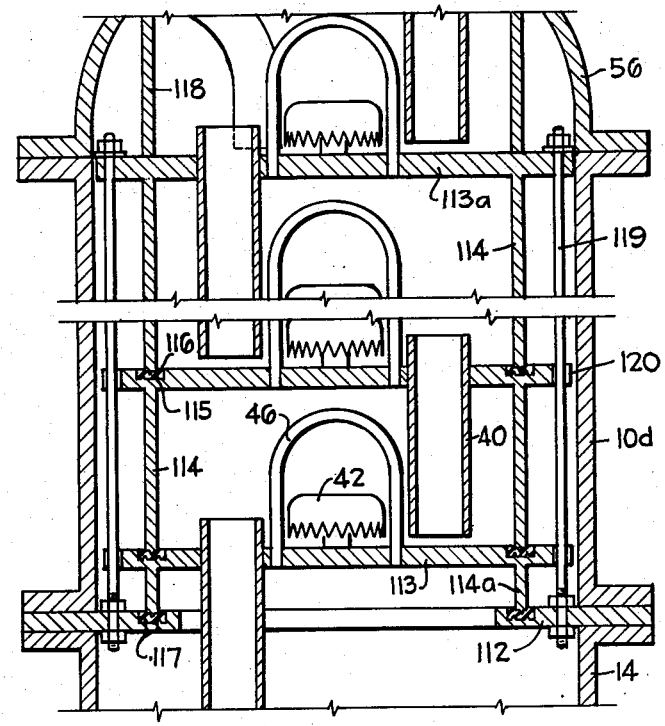
Fig. 11 is a fragmentary vertical sectional view of a modified column without liquid seals.

The modification shown in Fig. 11 dispenses with the liquid sealing arrangement and uses tray sections which may be used with or without an outer shell. Such shell may be desirable to add support to the tray sections, to improve thermal insulation and/or to permit the use of greater pressures or vacuum within the tray sections. As shown, the column comprises an outer shell 10d connected to a reboiler 14 and dome 56, operating as previously described. The reboiler shell carries an annular support plate 112 for supporting the tray deck 113 of the lowermost tray section. Each tray deck carries a depending support sleeve 114; the lower edge of which is shaped to insure a liquid-tight seal with the next lower tray deck. The support sleeve 114a of the lowermost section may be shorter and rests on the plate 112. To improve sealing the lower edges of the sleeves may be beveled to provide a narrow, or sharp annular edge, and the tray decks and plate 112 may be provided with annular grooves 115 containing a yieldable ring 116, e. g., made of gasket material or of soft metal such as lead, depending upon the corrosivity of the material to be distilled. The bottom of each groove 115 has two annular upward projections 117 to insure a liquid-tight seal. Each tray is further provided with a downspout 40, bubble cap 42 and bail 46. The uppermost tray deck 113a carries an upstanding liquid retaining sleeve 118 to prevent splashed liquid and froth from spilling into the annular space immediately inside of the shell 10d.

It will be noted that the difference between the pressures inside and outside of the sleeves 114 increases progressively toward the bottom of the column. The tightness of the seal of the sleeves 114 against the adjacent lower tray decks is also progressively more effective toward the bottom of the column because each sleeve supports the weight of all superior sections and liquid thereon. To still further improve the tightness tie rods 119, anchored in the plate 112, may be provided for urging the uppermost deck 113a downward, thereby deforming the packing rings 116 and forming more effective seals. These tie rods further serve as orientation guides for the intermediate tray decks which have notches 120 at their peripheries.

I claim as my invention:

1. A fractionating column comprising: a closed vertical shell having a top opening with a removable, fluid-tight closure and being adapted to maintain a pressure differential between the interior and exterior thereof; a plurality of at least three tray sections within said shell forming a vertical series of contact stages, each section having a tray deck with passageways for the upward flow of vapor and the downward flow of liquid through the decks arranged to effect intimate contact between said liquid and vapor with a pressure drop between stages, said tray sections being shaped to permit unimpeded vertical movement thereof as separate units through the shell to the top thereof and through said top opening upon removal of said closure; a closed annular wall on each tray section extending in sealed relation from the deck thereof vertically to a corresponding annular portion on an adjacent section, said walls enclosing liquid and vapor contact spaces within themselves, and the wall and decks of at least a plurality of lower sections having clearances with respect to the shell to define a common outer space between the shell and said lower sections extending vertically through the height of several tray sections; an annular seal between each annular wall and its corresponding annular part on the adjacent section arranged to prevent the outward flow of vapor from said contact spaces into said outer space, each seal comprising a trough adapted to retain a pool of liquid that contacts the inner and outer sides of the annular wall, whereby said seals can be established by successively lowering tray sections through the shell and said contact spaces can be maintained at progressively different pressures independent of the pressure in said outer space; seal means between the lowermost tray section and the shell closing off the bottom of said outer space, whereby the pressure in said outer space is isolated from the pressure immediately beneath the tray deck of said lowermost tray section; and a vapor passageway interconnecting said outer space with one of the upper contact spaces, whereby the pressure in said outer space will be that of said one upper contact space.

2. A fractionating column comprising: a closed vertical shell having a top opening with a removable, fluid-tight closure and being adapted to maintain a pressure differential between the interior and exterior thereof; a plurality of at least three separately removable tray sections within said shell forming a vertical series of contact stages, each tray section having a tray deck with passageways for the upward flow of vapor and the downward flow of liquid through the decks arranged to effect intimate contact between said liquid and vapor with a pressure drop between stages and to maintain a body of liquid on the deck and a vapor space above the body of liquid, the said tray sections being shaped to permit unimpeded vertical movement thereof as separate units through the shell to the top thereof and through said top opening upon removal of said closure; a supporting sleeve depending in sealed relation from each tray deck above the lowermost tray deck and resting releasably on the next lower tray section immersed in the body of liquid on the deck thereof; and a liquid seal sleeve rising from each tray section in sealed relation thereto to a height above the body of liquid on the deck thereof by a distance exceeding the product of $h$ and $(n-2)$, wherein $h$ is the liquid head corresponding to the said pressure drop between adjacent stages and $n$ is the number of the tray section counting from the top, each liquid seal sleeve having a diameter greater than that of the support sleeve of the adjacent higher section to form an annular trough for a pool of liquid surrounding the said support sleeve, thereby providing a liquid seal permitting the vapor spaces of progressively lower trays to be maintained at progressively greater pressures, and said tray sections and sleeves providing a clearance with respect to the shell to permit pressure equalization among the outer spaces at different levels between the shell and the several tray sections.

3. A fractionating column according to claim 2 wherein the uppermost tray section is sealed to the shell and the supporting sleeve thereof is provided with a passageway above the body of liquid on the adjacent lower tray deck for equalizing the pressure of the vapor space above said body of liquid and the pressure of the said outer spaces, whereby the pressure of the said vapor space above the second tray deck is effective against the surfaces of said pools of liquid in each of the annular troughs.

4. A fractionating column according to claim 2 wherein the vapor space above the uppermost tray deck is in communication with the said outer spaces, whereby the pressure of the said vapor space above the uppermost tray deck is effective against the surfaces of said pools of liquid in each of the annular troughs.

5. A fractionating column according to claim 2 wherein said shell has on the inside thereof a vertical guide and at least one tray section has a complementary guide shaped to prevent relative rotation between the tray section and the shell for maintaining the tray section in a predetermined orientation.

6. A fractionating column comprising: a closed vertical shell adapted to maintain a pressure differential between the interior and exterior thereof; a plurality of at least three separately removable tray sections within said shell forming a vertical series of contact stages, each tray section having a tray deck with passageways for the upward flow of vapor and the downward flow of liquid through the decks arranged to effect intimate contact between said liquid and vapor with a pressure drop between stages and to maintain a body of liquid on the deck, said tray sections being shaped to permit unimpeded vertical movement thereof through the shell; a supporting sleeve depending in sealed relation from each tray deck above the lowermost tray deck and resting releasably on the next lower tray section immersed in liquid on the said lower section; and a liquid seal sleeve rising from each tray-section in sealed relation thereto and having a diameter larger than that of the supporting sleeve of the adjacent higher section, the liquid seal sleeve of at least some of the tray sections being taller than the supporting sleeves of the respectively adjacent higher tray section so as to surround the latter supporting sleeves for the full heights thereof, each liquid seal sleeve forming an annular trough for a pool of liquid about the supporting sleeve of the adjacent higher section, thereby providing a liquid seal permitting the spaces above the several tray decks to be maintained at progressively different pressures, and said tray sections and sleeves providing a clearance with respect to the shell to permit pressure equalization among the outer spaces at different levels between the shell and the several tray sections.

7. A fractionating column comprising: a closed vertical shell adapted to maintain a pressure differential between the interior and exterior thereof; a plurality of at least three separately removable tray sections within said shell forming a vertical series of contact stages, each tray section having a tray deck with passageways for the upward flow of vapor and the downward flow of liquid through the decks arranged to effect intimate contact between said liquid and vapor with a pressure drop between stages and to maintain a body of liquid on the deck, said tray sections being shaped to permit unimpeded vertical movement thereof as separate units through the shell; a supporting sleeve depending in sealed relation from each tray deck, the support sleeve of each section above the lowermost section resting releasably on the next lower tray section and being immersed in the liquid on the said lower section; a liquid seal sleeve rising from each tray section in sealed relation thereto and having a diameter larger than that of the supporting sleeve of the adjacent higher section, forming an annular trough for a pool of liquid about the supporting sleeve of the adjacent higher section, thereby providing a liquid seal permitting the spaces above the several tray decks to be maintained at progressively different pressures, and said tray sections and sleeves providing a clearance with respect to the shell to permit pressure equalization among the outer spaces at different levels between the shell and the several tray sections, said column having a vapor chamber immediately beneath the lowermost of said sections adapted to be maintained at a pressure higher than that of the said outer spaces; an annular support plate sealed to the shell within said vapor chamber situated beneath and in supporting relation to the support sleeve of the said lowermost tray section, whereby there is formed a lower annular trough between the last-mentioned sleeve and the shell with said support plate at the bottom and open at the top to said outer spaces, the central opening of said plate containing vapor; and liquid flow communicating means between the space above the said lowermost tray deck and said lower annular trough for admitting liquid from said tray deck to said lower trough to provide a liquid seal for preventing flow of vapor from the vapor chamber into said outer space.

8. A fractionating column according to claim 7 wherein said annular support plate has an upstanding annular flange at the radially inner margin thereof inside of the support sleeve of said lowermost tray section.

9. A fractionating column comprising a reboiler; an annular plate sealed to and located above the reboiler, the central opening of said annular plate affording vapor communication with the interior of the reboiler; an upright cylindrical shell having a top opening and sealed to the top of said plate radially outwardly from said central opening; a closure removably connected to said top opening of the shell; means for supplying a distilland to the column; means for withdrawing distillation bottoms from the column; and a plurality of separately removable tray sections within said shell forming a vertical series of stages therein, each tray section having a tray deck, a downspout and a bubble cap, the lowermost tray section having a dependent annular wall resting on said annular plate and tray sections superior thereto being supported each from a section inferior thereto, said shell and tray sections being shaped to permit unimpeded vertical movement of the tray sections therethrough to the top; means independent of the shell for sealing adjacent tray sections with respect to one another from an outer space within the shell and outside of the tray sections extending throughout the height of the said plurality of sections, whereby said sections can be maintained at progressively different pressures independent of the pressure in said outer space; and means for isolating said reboiler from said outer space against by-passing flow of fluids including said dependent annular wall on the lowermost section, said annular wall having vapor on the inside thereof opposite liquid on the outer side thereof, said liquid being a part of the liquid on the deck of the lowermost tray section, resting on said annular plate, and having the surface thereof exposed to the pressure in said outer space.

10. A fractionating column comprising upper and lower closed vertical shells sealed to one another at an intermediate level of the column, said shells having top openings and the upper shell having a removable, fluid-tight closure, said shells being adapted to maintain differential pressures between their interiors and the exteriors thereof; a plurality of at least three tray sections within each of said shells separately removable from said shells as complete units by vertical movement through their respective shells and forming vertical series therein, each tray section having a tray deck with passageways for the upward flow of vapor and the downward flow of liquid through the decks arranged to effect intimate contact between said liquid and vapor with a substantial pressure drop between stages; walls independent of and within said shells disposed to seal said tray sections with respect to one another against passage of fluids and having clearances with respect to said shell to form outer spaces between the shells and the tray sections, each of said outer spaces extending uninterruptedly through the height of several tray sections to have a substantially uniform pressure throughout said height while the pressures within said walls above the several tray decks are progressively greater from the top of the upper shell to the bottom of the lower shell; and means supporting and sealing the tray deck of the lowermost tray section in the upper shell to the lower part of the upper shell, thereby isolating the outer space of the upper shell from the outer space of the lower shell, each of said outer spaces being in vapor flow communication with one of the spaces above one of the two uppermost tray decks within the respective shell, whereby the outer space of said lower shell can be maintained at a greater pressure than the outer space of the upper shell.

11. A fractionating column comprising upper and lower closed vertical shells sealed to one another at an intermediate level of the column, said shells having top openings and the upper shell having a removable, fluid-tight closure, said shells being adapted to maintain differential pressures between their interiors and the exteriors thereof; a plurality of at least three tray sections within each of said shells separately removable from said shells as complete units by vertical movement through their respective shells and forming vertical series therein, each tray section having a tray deck with passageways for the upward flow of vapor and the downward flow of liquid through the decks arranged to effect intimate contact between said liquid and vapor with a substantial pressure drop between stages; walls independent of and within said shells disposed to seal said tray sections with respect to one another against passage of fluids and having clearances with respect to said shell to form outer spaces between the shells and the tray sections, each of said outer spaces extending uninterruptedly through the height of several tray sections to have a substantial uniform pressure throughout said height while the pressures within said walls above the several tray decks are progressively greater from the top of the upper shell to the bottom of the lower shell; means supporting and sealing the tray deck of the lowermost tray section in the upper shell to the lower part of the upper shell, thereby isolating the outer space of the upper shell from the outer space of the lower shell, whereby the outer space of said lower shell can be maintained at a greater pressure than the outer space of the upper shell, and conduit means at said intermediate level immediately below the said means supporting and sealing the lowermost tray section of the upper shell establishing flow communication between the inside and outside of the column for the introduction or discharge of fluid.

12. A fractionating column comprising an upper and a lower vertical shell sealed to one another at an intermediate level of the column; a plurality of separately removable tray sections within each of said shells forming vertical series therein, each tray section having a tray deck, a downspout and a bubble cap, said shells being shaped to permit unimpeded vertical movement of the tray sections contained within the respective shells to the tops of said sections; a supporting sleeve depending from each tray deck and sealed thereto and engageable with the next lower tray section to rest thereon; a liquid seal sleeve rising from each tray deck and sealed thereto and having a diameter larger than that of the supporting sleeve of the adjacent higher section, each of said liquid seal sleeves being spaced from the inside of its respective shell and forming an annular trough for a pool of liquid about the supporting sleeve of the adjacent higher section to form a liquid seal; an annular plate within the column at said intermediate level sealed externally to said upper shell and affording support to the lowermost section of the upper shell and forming the bottom of an annular trough for pool of liquid surrounding the supporting sleeve of said lowermost section; and conduit means at said intermediate level and below said annular plate establishing flow communication between the inside and outside of the column for the introduction or discharge of fluid.

13. The fractionating column according to claim 12 wherein the tray deck of the uppermost section of the lower shell is sealed to the lower shell and the supporting sleeve depending from the tray deck of said uppermost section is provided with a passageway for equalizing the vapor pressures inside and outside of said supporting sleeve, whereby the annular space immediately inside of the lower shell and outside of the liquid seal sleeves therein is maintained at the pressure of the space above the tray deck of the second section of the lower shell and said pressure is effective against the surfaces of said pools of liquid in the lower shell.

14. The fractionating column according to claim 12 wherein the shells are spaced apart vertically by an intermediate section, and the said conduit means extends through the side wall of said intermediate section.

CHARLES O. HURD.

References Cited in the file of this patent

UNITED STATES PATENTS

| Number | Name | Date |
| --- | --- | --- |
| 344,322 | Lunge | June 22, 1886 |
| 573,956 | Bachman et al. | Dec. 29, 1896 |
| 729,121 | Boby | May 26, 1903 |
| 852,487 | Zscheck | May 7, 1907 |
| 1,467,583 | Lichtenthaeler | Sept. 11, 1923 |
| 1,686,542 | Winkler et al. | Oct. 9, 1928 |
| 1,711,656 | Risdon | May 7, 1929 |
| 1,889,254 | Lea | Nov. 29, 1932 |
| 2,241,370 | Armstrong | May 6, 1941 |

FOREIGN PATENTS

| Number | Country | Date |
| --- | --- | --- |
| 37,593 | Germany | Nov. 10, 1886 |
| 91,717 | Germany | May 6, 1897 |
| 24,598 | Great Britain | Dec. 24, 1914 |
| 295,365 | Italy | Apr. 19, 1932 |